(12) United States Patent
Oettinger et al.

(10) Patent No.: US 7,239,436 B2
(45) Date of Patent: Jul. 3, 2007

(54) METHOD FOR ALIGNING CONSECUTIVE SCAN LINES ON BI-DIRECTIONAL SCANS OF A RESONANT MIRROR

(75) Inventors: Eric Gregory Oettinger, Rochester, MN (US); James Eugene Noxon, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 140 days.

(21) Appl. No.: 11/205,456

(22) Filed: Aug. 17, 2005

(65) Prior Publication Data
US 2007/0041069 A1 Feb. 22, 2007

(51) Int. Cl.
*G02B 26/08* (2006.01)

(52) U.S. Cl. .................................... 359/214; 359/224

(58) Field of Classification Search ................. None
See application file for complete search history.

(56) References Cited

U.S. PATENT DOCUMENTS 5,477,330 A * 12/1995 Dorr ........................ 358/296
6,937,372 B2 * 8/2005 Kandori et al. ............ 359/198

* cited by examiner

*Primary Examiner*—Euncha P. Cherry
(74) *Attorney, Agent, or Firm*—William B Kempler; W. James Brady, III; Frederick J. Telecky, Jr.

(57) ABSTRACT

A method for aligning consecutive scan lines of a mirror based visual system produced by the bi-directional scan of a resonant mirror is disclosed. The actual position for the mirror is determined or measured by any suitable method. The measured position of the mirror is used to generate a first trigger signal to start a scan line in a first direction at a selected location and to generate a trigger to start a scan line in the reverse direction at a second location.

21 Claims, 6 Drawing Sheets

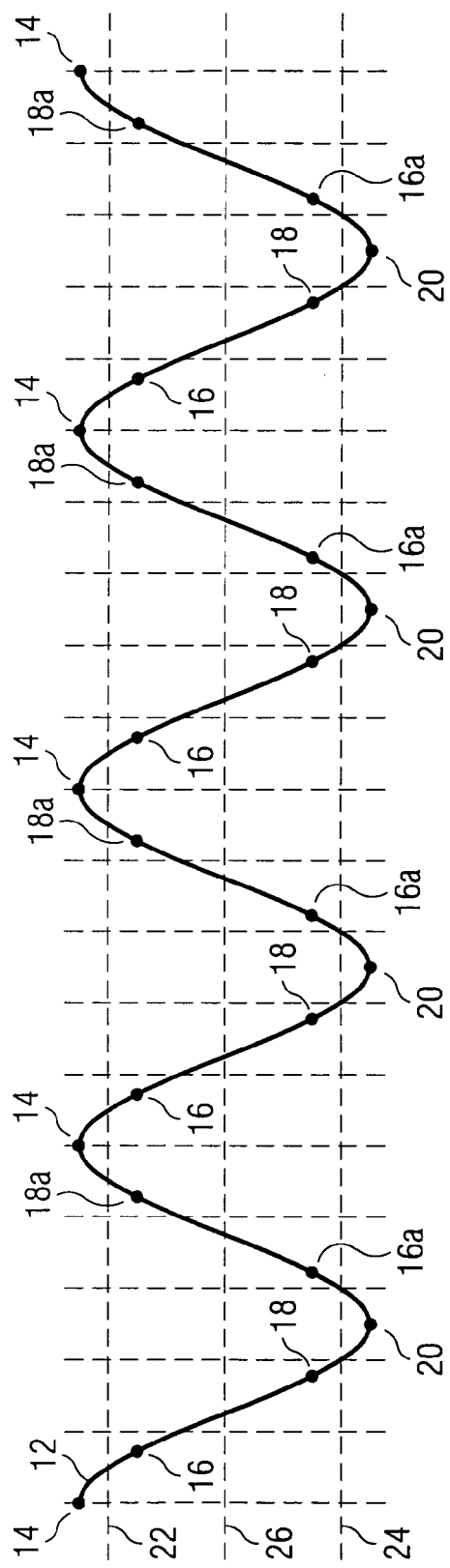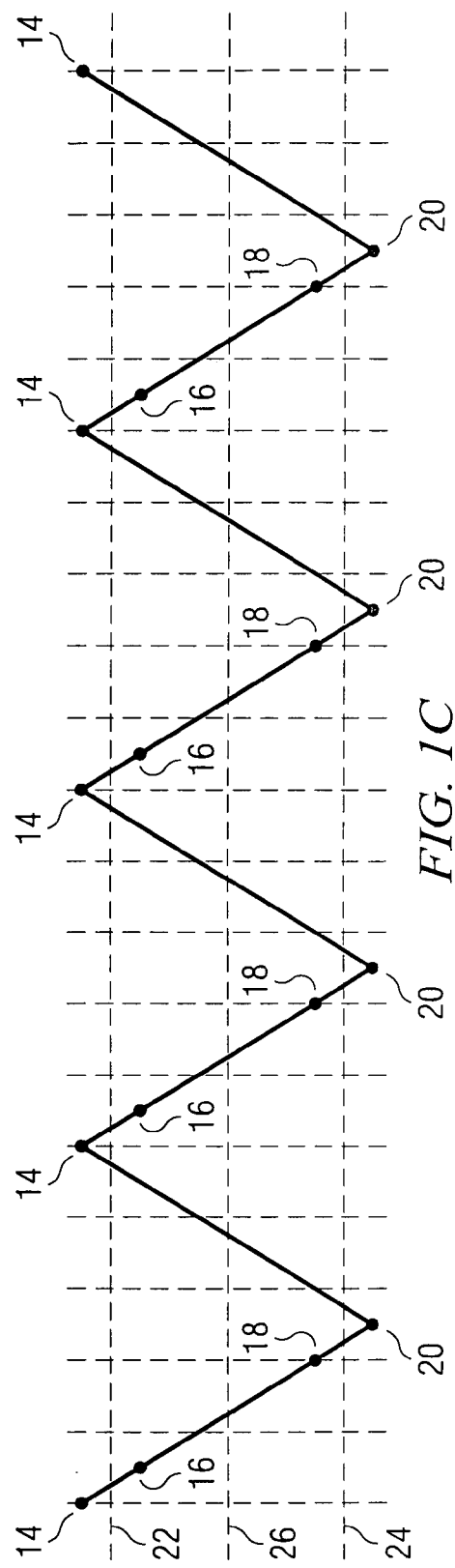

METHOD FOR ALIGNING CONSECUTIVE SCAN LINES ON BI-DIRECTIONAL SCANS OF A RESONANT MIRROR

TECHNICAL FIELD

The present invention relates to video display systems comprising a high speed resonant scanning mirror for generating image or scan lines to produce an image frame, and a low frequency oscillating mirror responsive to a cyclic drive such as a sinusoidal drive signal. The low frequency oscillating mirror moves substantial orthogonal to the high speed mirror for positioning each of the scan lines.

The invention is also applicable for use with laser printers. However, for most laser printer applications, a low frequency mirror is not required. The orthogonal motion is typically provided by the rotating photosensitive drum. More particularly, the present invention relates to improving the quality, brightness, and printing speed of an image by generating properly aligned scan lines in both directions of travel of the high speed resonant mirror.

BACKGROUND

In recent years torsional hinged high frequency mirrors (and especially resonant high frequency mirrors) have made significant inroads as a replacement for spinning polygon mirrors as the drive engine for laser printers. These torsional hinged high speed resonant mirrors are less expensive and require less energy or drive power than the earlier polygon mirrors.

As a result of the observed advantages of using the torsional hinged mirrors in high speed printers, interest has developed concerning the possibility of also using a similar mirror system for video displays that are generated by scan lines on a display surface.

Existing CRT (cathode ray tube) video systems for displaying such scan-line signals on a display screen use a low frequency positioning circuit to synchronize the display frame rate with an incoming video signal, and a high frequency drive circuit to generate the individual image lines (scan lines) of the video. In the CRT systems, the high frequency circuit operates at a frequency that is an even multiple of the frequency of the low speed circuit and this relationship simplifies the task of synchronization.

Therefore, it would appear that a very simple corresponding torsional hinged mirror display system would use a first torsional hinged high speed scanning mirror to generate scan lines and a second slower torsional hinged mirror to provide the orthogonal motion necessary to position or space the scan lines to produce a raster "scan" similar to the raster scan of the electron beam of a CRT. Unfortunately, the problem is more complex than that. First of all, scanning motion of a high speed resonant mirror cannot simply be selected to have a frequency that is an even multiple of the positioning motion of the low frequency mirror.

Second, although a raster scan CRT system is easily controlled and sufficiently bright for most applications, the display of a corresponding raster scan mirror based system may be dim, and would benefit from an increase in brightness. For example, the modulated light beam is typically on for no more than 10 to 20% of the time. More specifically, the modulated light source of existing mirror visual systems is turned on and produces a scan line only when the mirror is moving or sweeping in one direction, (i.e. 50% of the time). Likewise, an image frame is generated only when the low speed cyclic positioning mirror is moving in one direction. Consequently, the time is reduced another 50%, thereby leaving a maximum possible "on-time" of the modulated beam of only 25%. Finally, since the oscillating mirrors travel in one direction, stop and turn around and then travels in the opposite direction, these turn-around portions (or peak points of the sinusoidal movement) are unsuitable for displaying images. As an example only, if the oscillating mirror has an overall or average frequency of 60 Hz or 20 kHz, yet must slow down, come to a complete stop, and then accelerate in the opposite direction each time the beam sweeps across a display, it will be appreciated that the angular velocity of the mirror movement is anything but constant. However, to generate an undistorted image from periodically received pixels, the velocity of an oscillating mirror during the display portion of its travel should be substantially constant. Consequently, as much as 50% of the mirror movement that is located at turn around or peak portions cannot be used, which leaves potentially less than about 10% of the total time that the modulated light beam is generating an image.

Based on the foregoing discussion, an immediate and easy solution to the brightness problem would appear to only require the system to generate another image frame during the unused half of the cyclic motion of the slow speed positioning mirror, or alternately, that a scan line be generated for each back and forth sweep of the resonant mirror rather than during a sweep in only one direction. This would double the brightness. Alternately, the unused half of the mirror travel of both mirrors could be used to increase the brightness of the image by a factor of four.

According to the present invention, the image brightness is doubled and the quality of the image improved by using both directions of the bi-directional beam sweep of the high speed resonant mirror to generate a scan or image line, and is applicable for use with both visual display systems and laser printer systems. Unfortunately, the problem is not solved by simply deciding to generate a scan line in both directions of the bi-directional beam sweep. The difficulty is aligning the two consecutive scan lines for an acceptable display.

However, in addition to aligning the two consecutive scan lines formed by the bi-directional sweep when used with visual display systems, the positioning motion of the low frequency mirror and, consequently, the low frequency drive signal must also be synchronized with the image frame rate of the incoming video signals to avoid noticeable jumps or jitter in the display. At the same time, however, the high frequency mirror, whether used with a visual display or a laser printer, must run or oscillate at substantially its resonant frequency, since driving a high-Q mirror at a frequency only slightly different than the resonant frequency will result in a significant decrease in the amplitude of the beam sweep (i.e. reduce the beam envelope). This would cause a significant and unacceptable compression of the image on the display. Therefore, for visual display systems, the high speed mirror drive is decoupled from the low speed mirror drive. That is, as mentioned above, the high speed drive signal cannot simply be selected to be an even multiple of the low speed drive signal.

Further, in a digital imaging system, each frame or image of incoming signals representing image pixels (such as might be received from a computer hard drive, a TV station, a DVD player or a VCR player) must still be faithfully reproduced. This means, each pixel of each successive image (or printed page) must be properly located on the screen of the display (or the printed page) in both directions if distortions are to be avoided. Also of course, if complete images or complete scan lines are lost or dropped, glitches or artifacts in the display would clearly be observed. Therefore, as described above in a torsional hinged mirror based video system, the low frequency mirror drive must still be synchronized to the flow rate of the incoming video signals. At the same time, however, the high speed mirror, whether used in a visual display or printer, must still oscillate at substantially its resonant frequency. The problems discussed above are even further complicated if there has been some degradation of the image signals. For example, if the source of the video signals is a VCR, one common problem such as stretching of the VCR tape could vary the incoming frame rate, which must also be dealt with. Additionally, tracking or synchronizing the low speed mirror and the frame rate should be done in a way that minimizes transients from discontinuities in the drive waveform.

Therefore, a mirror based imaging system having increased brightness and that overcomes the above mentioned problems would be advantageous, but doubling the beam "on time" by generating scan lines in each direction of the high speed bi-directional beam sweep presents many difficult challenges.

SUMMARY OF THE INVENTION

These and other problems are generally solved or circumvented, and technical advantages are generally achieved by the embodiments of the present invention, which provide a method of generating two scan or image lines for each full cycle of the high speed resonant mirror of a mirror imaging system. For visual display systems, it is also important to synchronize the low speed mirror with incoming frame or video signals while also synchronizing the decoupled resonant scanning mirror with the low speed mirror. For both laser printer systems and visual display systems, alignment of the scan lines displayed by both the forward and reverse sweeps of a high speed resonant mirror requires accurate monitoring of the angular position of the high speed mirror. The teachings of the present invention may also be used for the low speed positioning mirror of a visual display but may be overkill for many such applications, as other less expensive techniques may also be suitable.

More specifically, the method of this invention comprises the steps of oscillating a mirror at a selected frequency. The movement or position of the oscillating mirror is monitored by any suitable method and one or more signals representing the mirror position are provided to computation circuitry.

According to one embodiment, the position or movement of the mirror is monitored by directing a light source (e.g. an LED) having a wave length sufficiently different than the modulated light beam of the display system so that there is no interference between the light source and the modulated light beam on the oscillating mirror. A photo detector sensitive to the light source is positioned so that light from the source is reflected from the oscillating mirror and impinges on the photo detector when the oscillating mirror moves through a selected angular position. A position signal is generated by the photo detector each time light reflected from the mirror impinges on the photo detector. Other suitable methods of monitoring the movement of a position of the mirror include, but are not limited to, sensing a magnetic field generated by a permanent magnet attached to the mirror structure, sensing the electrical current generated by the stress applied to a piezoelectric element mounted on the mirror structure, etc.

The position signals, no matter how they are generated, are provided to computation circuitry, which determines the amplitude and phase of the mirror motion from the known mirror frequency and successive position signals received from the photo detector. First and second trigger signals are then generated from the known selected frequency of the oscillating mirror, along with the amplitude and phase information determined from the successive position signals. An incoming stream of data signals, representative of each image line of a laser printer or each scan line of a visual display system is then stored or buffered. Scan lines are then generated as the mirror sweeps in a first direction in response to the first trigger signal. Similarly, scan lines are generated as the mirror sweeps in the opposite direction in response to the second trigger signal. Although, the first and second trigger signals may be respectively generated in response to different position signals, a single position signal may generate the first trigger signal and then, after a selected delay, generates the second trigger signal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 1A and 1B illustrate, respectively, low speed (orthogonal positioning of the scan lines) and high speed (resonant scanning to generate the scan lines) cyclic signals for driving the mirrors about their axis;

FIG. 1C is the same as FIG. 1A, except a triangular low speed drive signal is illustrated rather than a sinusoidal drive signal;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 4:
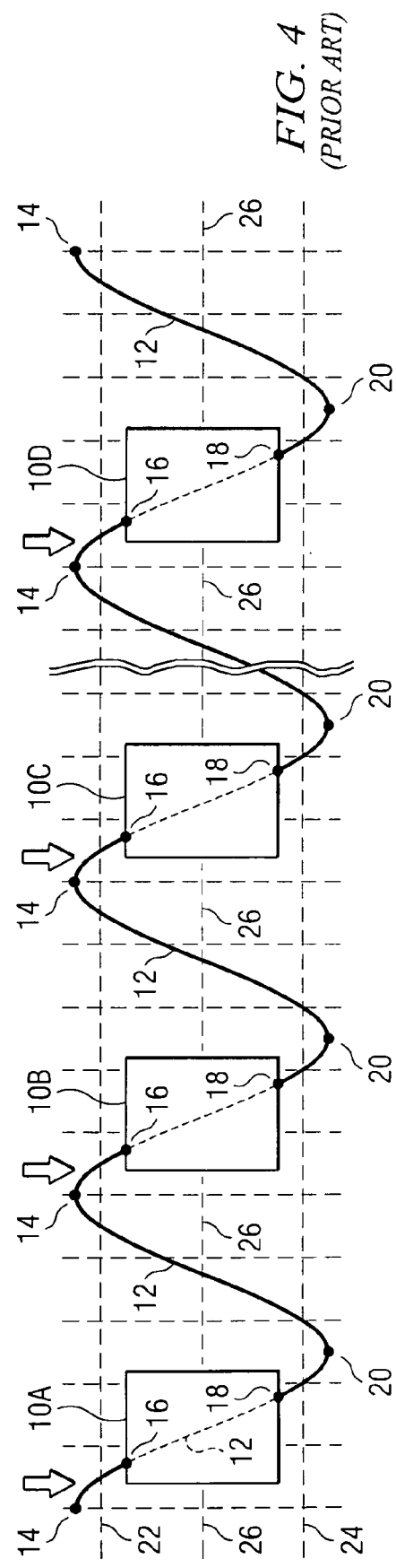
FIG. 4 is a prior art figure showing displays of video frames where the high frequency scan mirror operates at an even multiple of the low frequency positioning mirror.

Referring now to prior art FIG. 4, there is illustrated the interaction of a high speed horizontal scanning drive signal and a low speed (vertical) or scan line positioning signal used to control a prior art display formed by a raster scan, such as for example a CRT display. The terms "horizontal", used with respect to scanning drive signals, and "vertical", used with respect to the beam positioning signals, are for convenience and explanation purposes only, and it will be appreciated by those skilled in the art that the scan lines in a CRT display or a mirror based display could run vertical and the positioning signals could locate the vertical scan lines horizontally across a display screen.

As shown in FIG. 4, four typical frames of video such as indicated by image boxes 10a, 10b, 10c, and 10d are generated during the same (substantially linear) portion of each cycle of the slow speed sinusoidal drive signal represented by curve 12. More specifically, if the slow speed positioning signal has a frequency of 60 Hz, then in the example of prior art FIG. 4, sixty different frames of video (i.e. complete images) and not just the four as illustrated would be generated in one second. Further, if transition point 14 represents both the end point of each cycle of the positioning slow speed drive signal and the start point of the next cycle of the drive signal, then point 16 can be set to always occur at a certain time period thereafter. Therefore, point 16 can be selected as the starting point of each frame since each scan line has the same number of pixels and each frame has the same number of scan lines. Likewise, point 18 will be the end point of each frame. It should be noted that the term "frame" is used to indicate the image created during one forward or reverse sweep of the slow speed mirror.

In the prior art example of FIG. 4, the mirror travels in a reverse direction between point 20 and point 14 of the cycle as the low frequency signal and the low speed positioning mirror are repositioned for the next frame of video signals.

Figure 1B:
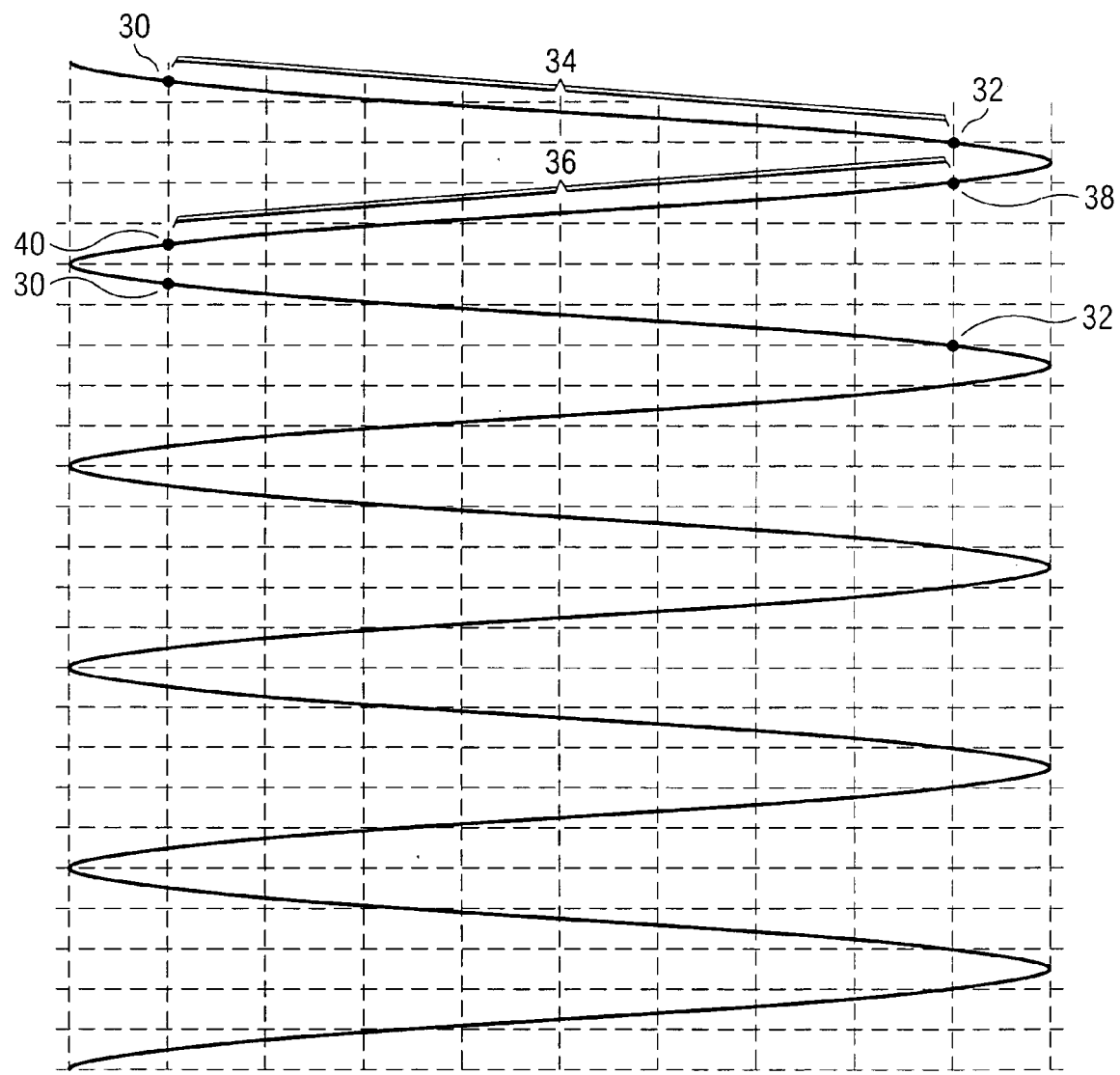

FIG. 1A is similar to FIG. 4 and represents the positioning or slow speed drive signal according to the present invention, without the frames of video. FIG. 1B represents the scanning drive signal and/or the corresponding scanning position of a resonant mirror according to the teachings of the present invention, but is not to scale with respect to FIG. 1A and, although theoretically possible, is not likely to have a frequency that is an even multiple frequency of the slow speed drive signal. As an example, the resonant frequency of a scanning torsional hinged mirror, such as illustrated in FIG. 1B, may be on the order of 20 kHz or greater.

FIG. 1C is similar to FIG. 1A, except as shown, the slow speed cyclic drive signal has a repetitive triangular shape rather than a sinusoidal shape. The portions of the curve above and below lines 22 and 24 respectively still represent the upper and lower peak (or turn-around) portions of the mirror movement, and the portion of the curve between lines 22 and 24 still represents the display portion of the signal and/or mirror movement where the video frame is generated.

The system of the present invention is preferably used with respect to generating a first scan line in the positive or forward going portions of the sinusoidal motion of a high speed resonant mirror and then also generating another scan line in the negative or reverse portions of the sinusoidal motion to increase quality or double the brightness of the display, or increase the printing speed of a laser printer. Further, it should be noted that the present invention may also be used with the slow speed or positioning mirror to align a first image frame generated during the positive going portions of the low speed positioning mirror with a second image frame generated during the negative going portions of the mirror. However, other less expensive methods of aligning image frames may be preferable for most applications. In any event, when the present invention is used with the slow speed positioning mirror to align image frames, point 16a represents the start point of a second image frame produced during a single sinusoidal cycle, and point 18a represents the end point of the second image frame. It will also be appreciated that the scan lines comprising an image frame will be displayed in the reverse order of the scan lines in the first image frame. However, as discussed above, the difficulty is not deciding to generate image frames in both directions of the moving mirror, but getting image frames generated in the positive going portion of the slow speed mirror to align with the image frames generated in the negative going portion of the slow speed mirror.

As discussed above, the present invention is preferably used to align a first scan line generated during the forward scan of the resonant beam sweep with a second scan line generated during the reverse scan of the resonant beam sweep. Therefore, referring again to FIG. 1B in a display system that provides bi-directional scan lines, point 30 represents the location of a first pixel in a forward moving scan line and point 32 represents the last pixel of the forward moving scan line. The full scan line is represented by bracket 34. As was discussed above and according to most existing mirror systems, a single scan line 34 is generated during the beam sweep in only one direction of the mirror, such as for example, left to right. Therefore, the mirror motion from right to left is often unused and wasted. However, according to the present invention, a second scan line represented by bracket 36 is also generated as the mirror moves in the reverse direction between start point 38, where the first pixel of the second scan line is displayed, and end point 40 where the last pixel of the second scan line is displayed. It will also be appreciated that the first pixel of the second scan line corresponds to the last pixel of the first scan line. Therefore, it will be appreciated that the "first" pixel displayed and the "last" pixel displayed of consecutive scan lines must be vertically aligned with each other (as discussed above, the use of the terms vertical and horizontal is for explanation purposes only, since the scan lines could be vertical rather than horizontal). In that case, the first and last pixels would be horizontally aligned.

Also, as was discussed above, it will be appreciated that if the scanning speed of a torsional hinge resonant mirror, as represented by the graph of FIG. 1B, could simply be selected to be an even multiple of the speed of the slow speed positioning bi-directional mirror, synchronization of scan lines and bi-directional images on a mirror display would be a straight forward timing issue. Unfortunately, although resonant mirrors can be manufactured within reasonable tolerances, the actual resonant frequencies cannot be controlled so that the resonant speed of the mirrors formed from a single silicon wafer could be precisely manufactured as an even multiple of a speed selected for the slow speed mirror. Further, as was disclosed above, driving a high speed resonant mirror at a speed only slightly off of its resonant speed can drastically reduce the sweep amplitude of the mirror.

Figure 2A:
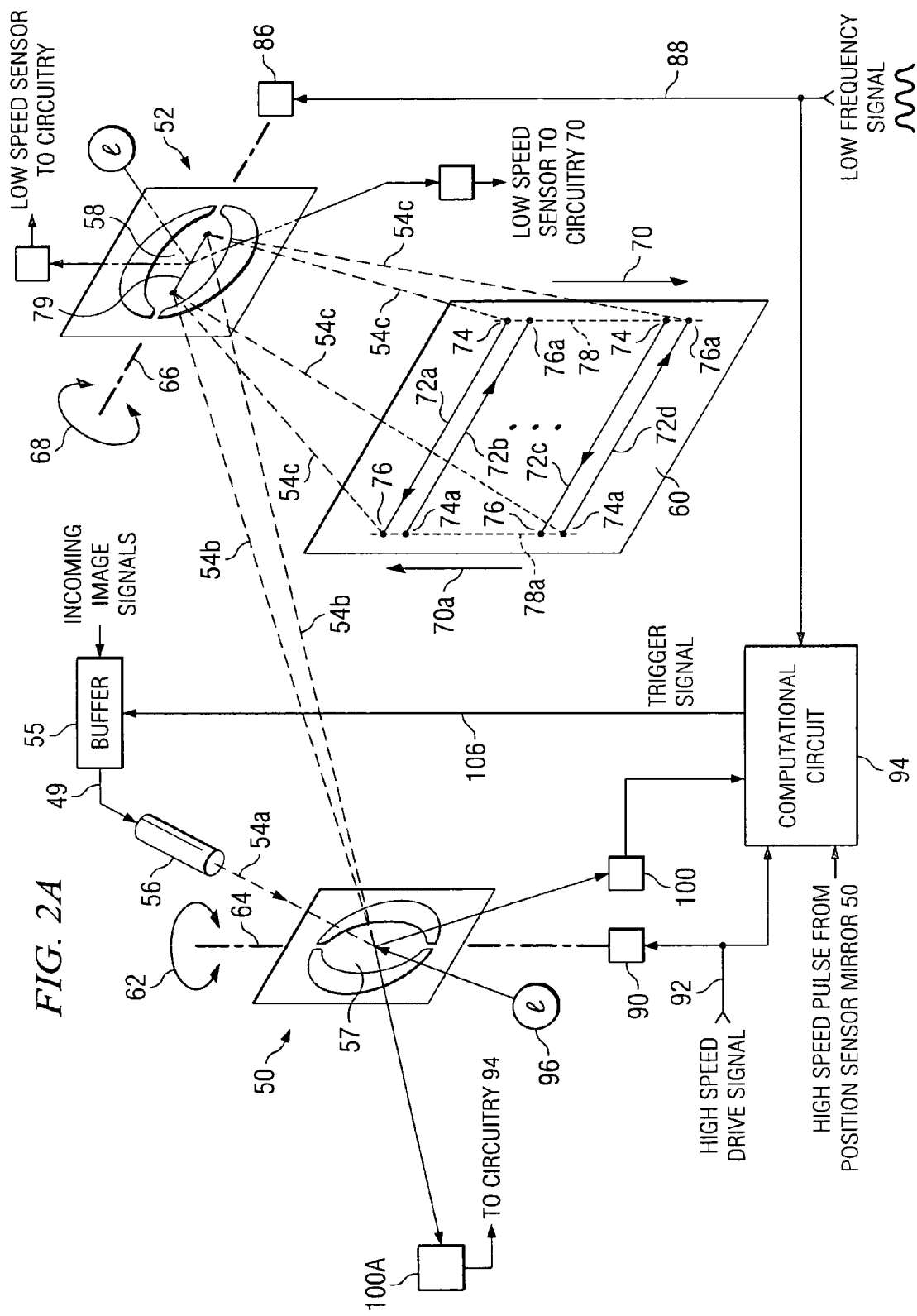
FIGS. 2A and 2B are simplified diagrams illustrating torsional hinged mirror based display systems using two single axis mirrors.

Referring now to FIG. 2A, there is a perspective illustration of an embodiment of the present invention that uses two single axis separate mirrors that pivot about their torsional hinges. As shown, a high frequency or scanning single axis torsional hinged mirror 50 may be used in combination with a low frequency or positioning single axis torsional hinged mirror 52 to provide a raster scan. A light beam 54a from a source 56 is modulated by incoming signals, which are stored in buffer 55 before being provided to light source 56. The buffered incoming signals used to modulate the light beam are provided on line 49 in response to a trigger signal to generate pixels that comprise the scan lines. The modulated light beam 54*a* impinges on the reflecting surface 57 of the high frequency resonant mirror 50 and is reflected as sweeping light beam 54*b* to the reflecting surface 58 of the low frequency positioning mirror 52. Positioning mirror 52 redirects the modulated light beam 54*c* to a display surface 60, which may be a screen or light sensitive printer medium. The oscillations of the high frequency scanning mirror 50 (as indicated by arcuate arrow 62) around pivot axis 64 results in light beam 54*c* (the scan lines) sweeping across the surface 60, (after being reflected from surface 58 of the positioning mirror 52). The oscillation of the positioning mirror 52 about axis 66 (as indicated by double headed arrow 68) results in the sweeping scan lines being properly positioned vertically (or orthogonally to the scan lines) on the display surface 60. It is again noted that the terms horizontal and vertical are for explanation purposes only. Therefore, since the scanning motion of light beam 54*c* across display surface 60 may occur several hundred or even a thousand times during the orthogonal movement in one direction of the low speed positioning mirror 52, as indicated by arrow 70, a raster scan type image can be generated or printed on display surface 60 as indicated by image lines 72*a*, 72*b*, 72*c*, and 72*d*. The light beam 54*c* may paint another image in the reverse direction as indicated by arrow 70*a*, as the light beam returns to the starting point 74.

More specifically, as shown, scan lines moving from right to left in FIG. 2A, such as scan lines 72*a* and 72*c*, have starting point 74 and an end point 76, whereas scan lines moving from left to right in FIG. 2A have a start point 74*a* and an end point 76*a*. The present invention provides apparatus and methods to align starting points 74 and, end points 76*a* as indicated by the right hand vertical line 78, and the starting points 74*a* and end points 76 as indicated by the left hand vertical line 78*a*.

Figure 2B:
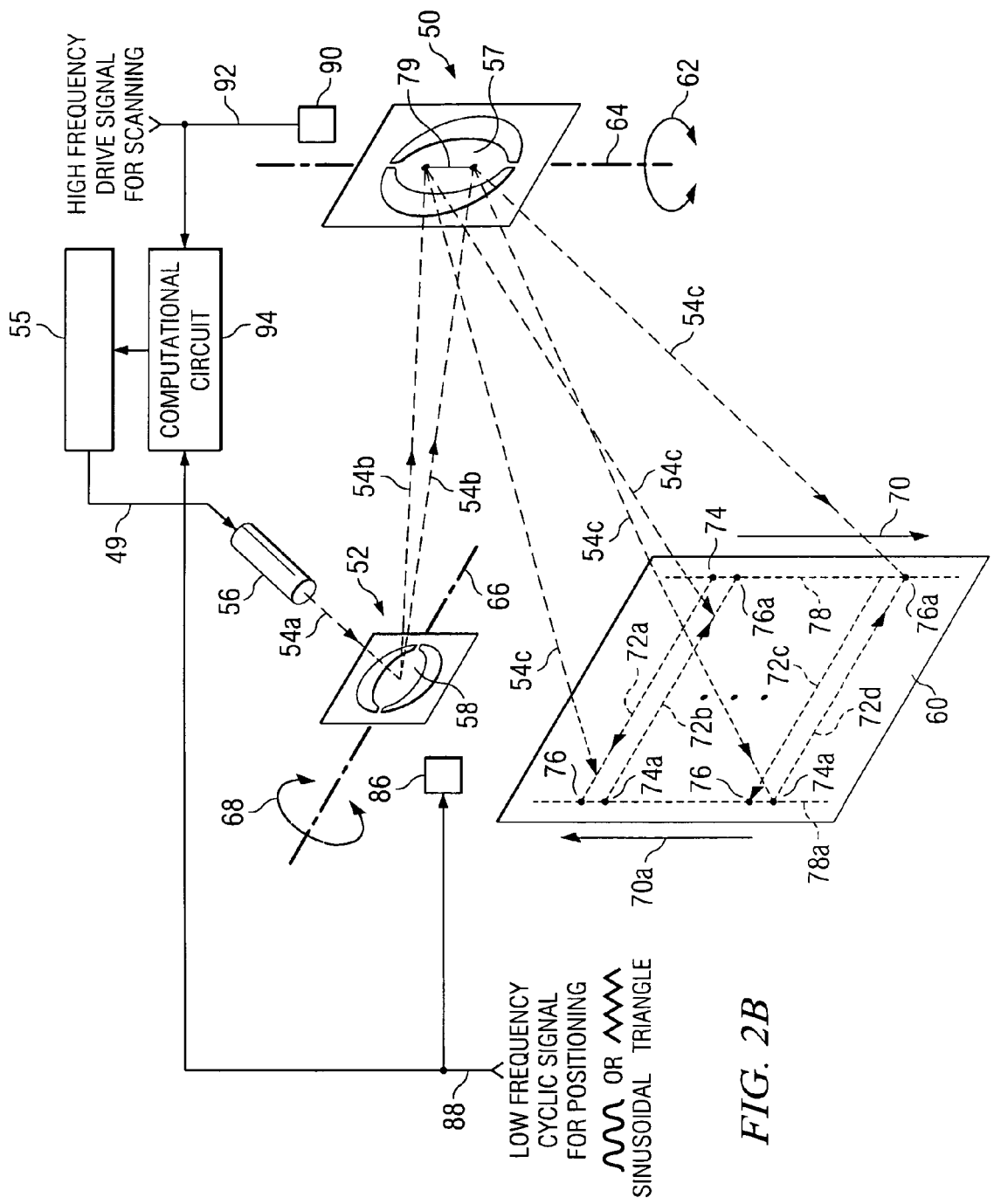

Referring to FIG. 2B, there is a perspective illustration of another embodiment of the present invention using two single axis separate mirrors that pivot about their torsional hinges. As shown, the high frequency or scanning single axis torsional hinged mirror 50 is again used in combination with the low frequency or positioning single axis torsional hinged mirror 52 to provide a raster scan type visual display. A light beam 54*a* from a source 56 is modulated by incoming video signals on line 49 from buffer 55, and impinges on the low frequency positioning mirror 52. The modulated light beam 54*b* is then reflected off of the surface 58 of mirror 52 to reflecting surface 57 of the high frequency oscillation or scanning mirror 50, which redirects the modulated light beam 54*c* to display screen or surface 60. The oscillations (as indicated by arcuate arrow 62) of the scanning mirror 50 about axis 64 results in light beam 54*c* sweeping back and forth across display screen 60.

It will also be appreciated that oscillations of the positioning mirror 52 about axis 66 as indicated by double headed arcuate arrow 68 will move the reflected modulated light beam 54*b*, with respect to scanning mirror 50, such that the light beam 54*b* moves orthogonally to the scanning motion of the light beam as indicated by line 79 in the middle of reflecting surface 58. Thus, it will be appreciated that the high frequency scanning motion of the light beam 54*c* movies alternately in both directions as indicated by image lines 72*a*, 72*b*, 72*c*, and 72*d* on display screen 60 and may occur several hundred or even a thousand times during a single orthogonal movement of the low frequency positioning mirror. Therefore, a raster scan type visual display can be generated or painted on display screen 60 in both directions from starting point 74.

Figure 2C:
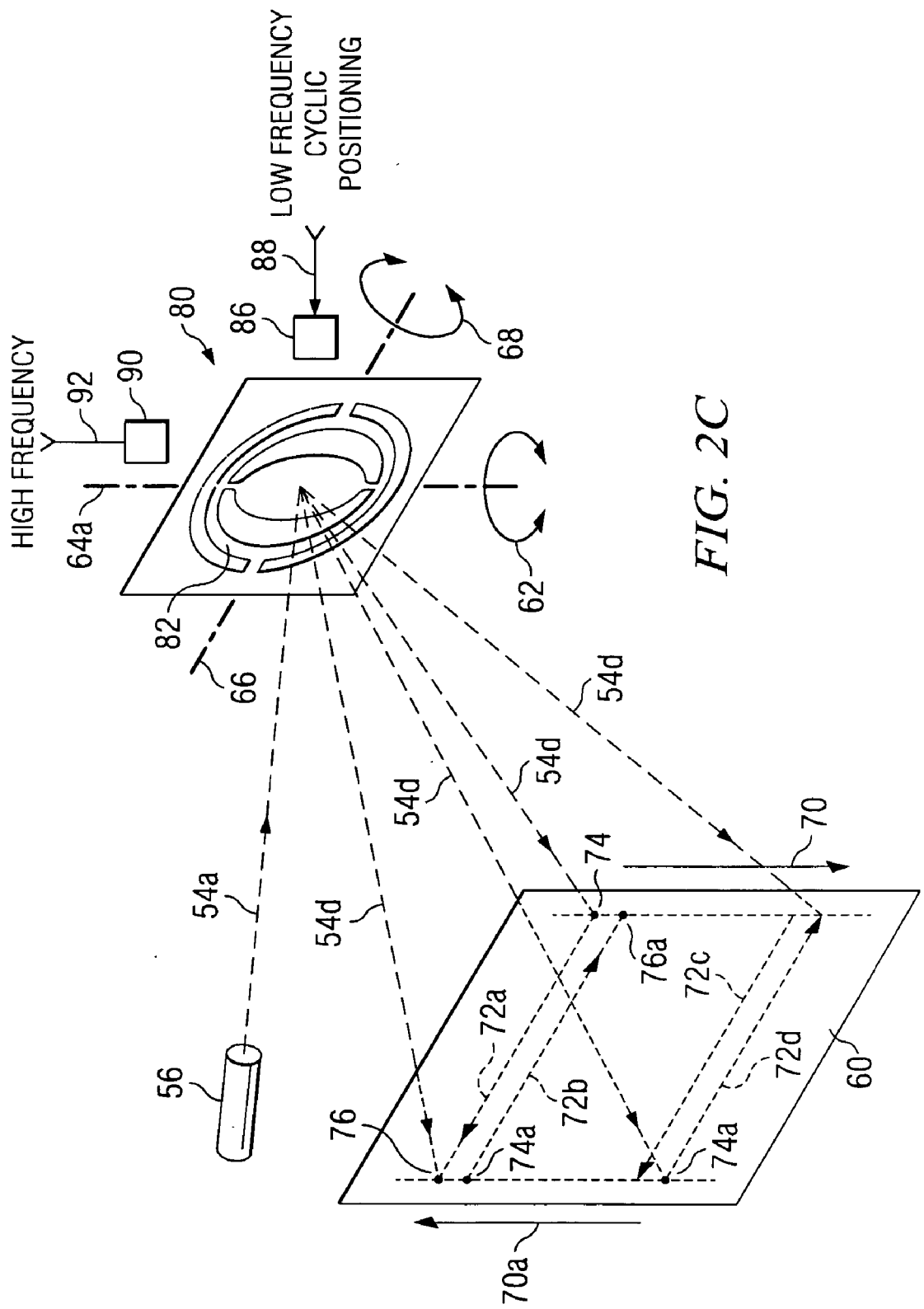
FIG. 2C is a simplified diagram illustrating another embodiment comprising a single dual axis mirror in place of the two single axis mirrors.

The above discussion is based on two single axis torsional hinged mirrors. However, as will be appreciated by those skilled in the art, a single dual axis torsional hinged mirror, such as mirror structure 80 shown in FIG. 2C and having a gimbals structure 82 may be used to provide both the high frequency scanning motion about axis 64*a*, as indicated by arcuate arrow 62, and the positioning or orthogonal motion about axis 66, in the same manner as the oscillation of the individual mirrors 50 and 52 discussed in the embodiments of FIGS. 2A and 2B. The remaining elements of FIG. 2C operate the same as in FIGS. 2A and 2B and, consequently, carry the same reference number. It should also be noted, however, that the modulated light beam 54*a* is only reflected one time and, therefore, to avoid confusion, the reflected beam carries reference number 54*d*.

As will be appreciated by those skilled in the art, the motion and corresponding position of the low speed mirror can be determined and/or reasonably predicted or estimated from the signals used to drive the mirror about its respective axis. Therefore, for many applications using only the drive signals (such as for example a sinusoidal drive signal) to determine or estimate the position of the low speed mirror for any selected point in time is sufficient. For example, referring again to FIGS. 2A, 2B, and 2C as shown, there is a drive mechanism 86 for positioning the low speed mirror 52 in response to a low frequency cyclic signal such as illustrated in FIGS. 1A and 1B which is received on input line 88. This low frequency cyclic drive signal is used to determine or estimate the position of mirror 52, and for most applications would be sufficient for aligning consecutive image frames generated by a positive and negative sweep of the slow speed mirror.

Similarly, there is included a high speed drive mechanism 90 responsive to high frequency signals on input line 92 for driving the high speed mirror at a known resonant frequency. Computing circuitry 94 also receives these high frequency and low frequency drive signals so that the frequency of the respective mirrors can be determined. In addition, the computing circuitry 94 may also estimate or calculate the positions of the low speed mirror from the low frequency drive signal. The low speed drive signal alone can often be used to calculate the position of the low speed mirrors, which is then used to then align consecutive image frames. Unfortunately, this technique is not suitable for use with the high speed mirror to align consecutive scan lines, as there is a 180° phase shift in the transfer function of the resonant mirror in the neighborhood of the resonant frequency. This phase shift prevents inferring or determining the position of the high speed mirror from the drive signal waveform alone. Consequently, a sensor for determining the actual position of the high frequency mirror is required.

Figure 3:
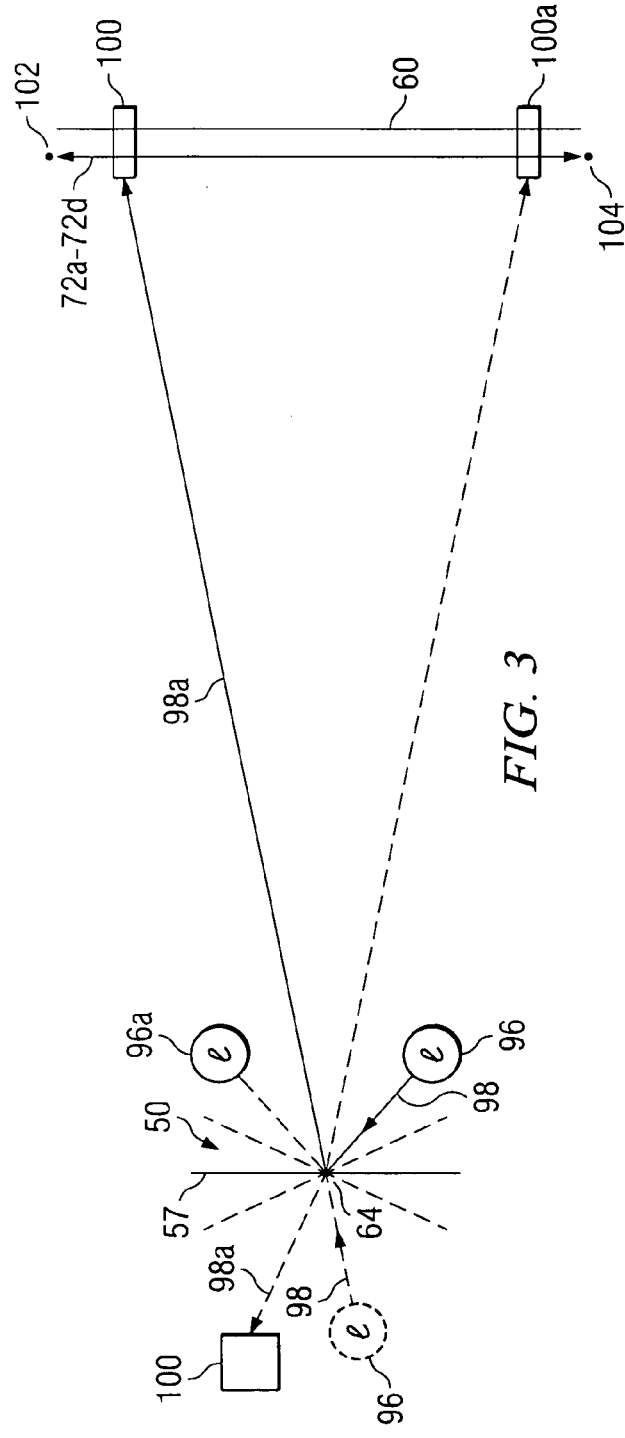
FIG. 3 is a simplified diagram that illustrates a separate light source and photo detectors for monitoring the position of an oscillating torsional hinged mirror, to allow alignment of pixels on two consecutive beam sweeps.

Therefore, referring again to FIG. 2A along with new FIG. 3, there is shown an embodiment of the present invention that may be used for determining the actual position of an oscillating mirror. As shown in FIG. 3, there is an edge view of a torsional hinged mirror oscillating around its pivot axis. Also, although the arrangement of FIG. 3 may be used with both the low speed mirror 52 and the high speed resonant mirror 50, it will be appreciated that the invention is particularly useful for determining the position of the high speed scanning mirror 50.

As discussed with respect to FIG. 2A above and according to one embodiment of the invention, there is further included a light source, such as for example an LED (light emitting diode) 96, directed toward the back side of high frequency oscillating mirror 50. Light source 96 is in addition to the modulated light beam 54a from source 56 and preferably has a wave length substantially different from the wave length of light beam 54a to avoid interference between the two light sources. Also included is at least one photosensor 100 sensitive to the wave length of light from LED 96.

However, the illustration of FIG. 2A shows two photosensors 100 and 100a, and the portion of the top view of FIG. 3 located to the right of the mirror 50 shows a second embodiment for sensing the angular position of mirror 60. As shown in the right hand portion, photosensor 100 is positioned at a selected and known location on the front side of scanning mirror 50 as is LED light source 96. The sensor 100 is located proximate the end point 102 of the beam sweep so that light from LED 96 reflecting off of mirror surface 57 of scanning mirror 50 (shown by line 98a) will intercept sensor 100 when the mirrors angular rotation is at a selected location near the end point of the beam sweep. It will be appreciated that knowing the frequency of the drive signal and the specific time that the mirror is at a selected or known location, allows calculations of the mirror at all points of an oscillation cycle of the mirror.

It may also be useful and provide even greater accuracy to position the first sensor 100 at a location so that the light from LED 96 light is intercepted proximate the end portion 102 of the mirror travel in one direction and include a second sensor 100a proximate the end portion 104 of the mirror travel in the opposite direction. Although a single light source 96 should be sufficient for most applications, a second light source 96 could also be included. Of course, physical size and conditions may dictate that the placement of the photosensors 100/100a and/or the LED light sources 96 and/or 96a cannot be on the front side of the mirror 50. In that situation as shown in the portion of FIG. 3 to the left of mirror 50, the light source 96 may be located so that light is reflected off of the back side of the mirror toward sensor 100 as also shown in FIG. 2A and by dashed lines in FIG. 3.

Although several embodiments of LED light sources and photosensors have been described, it should be appreciate that other methods or techniques that accurately sense the position of the high speed mirror 50 are equally suitable. For example, a permanent magnet (not shown) may be included on the pivoting mirror or the torsional hinge so that the magnet rotates with the mirror (or hinge). An electromagnetic coil (not shown) is positioned proximate the rotating permanent magnet such that a current is generated in the coil that is representative of the angular position of the mirror. The angular position of the mirror may also be determined by mounting a piezoelectric element on the mirror structure (not shown) to measure stress in the structure caused by the rotating mirror. The changing stress in the piezoelectric element will correspond to the angular position of the mirror.

Then, according to an embodiment of the invention, first and second positioning mirror trigger signals are generated when the low frequency mirror is at a known rotational location or position in both the forward and reverse movement of the low frequency mirror and may be referred to as "arming" signals, which are used to position the first scan lines. Likewise, scanning mirror "trigger" signals are generated when the high speed mirror is at a known rotational or scanning location in both the forward and reverse movement of the high speed mirror as determined by at least one of the sensors 100 and/or 100a. The first and second positioning mirror trigger or arming signals and the first and second scanning mirror trigger signals are provided on line 106 to buffer 55, which then initiates the release or distribution of the output signals used to modulate the light beam and paint the scan or image line.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of aligning defined first start and end points of a forward moving sweep of an oscillating mirror with defined second end and start points respectively of a reverse moving sweep of the oscillating mirror comprising the steps of:
   oscillating said mirror at a selected frequency;
   sensing when said oscillating mirror is at a known precise position and provide a position signal indicative thereof;
   calculating said first and second start points from said position signal, said selected frequency, and amplitude of said mirror; and
   generating a first trigger signal during the travel of said mirror in a first direction in response to said calculated first start point and generating a second trigger signal during travel in a second direction of said mirror in response to said calculated second start point.

2. The method of claim 1 wherein said mirror is a high frequency resonant mirror and further comprising the steps of:
   directing a modulated light beam toward said oscillating mirror;
   generating scan lines from said modulated light beam during travel of said mirror in said first direction in response to said first trigger signal; and
   generating scan lines during travel of said mirror in said second direction in response to said second trigger signal.

3. The method of claim 2 wherein said alignment of said start and end points respectively comprises the steps of aligning consecutive scan lines to generate an image.

4. The method of claim 3 wherein said steps of directing said modulated light beam comprises directing said modulated light beam so that it is reflected from said high frequency resonant mirror and wherein said step of aligning comprises oscillating a second mirror at a speed slower than said selected frequency to position said scan lines traveling in said first direction with said scan lines traveling in said second direction.

5. The method of claim 4 further comprising the steps of:
   sensing when said second oscillating mirror is at a known precise position and provide a signal indicative thereof;

calculating first and second start points of said second mirror; and generating a first arming signal during the travel of said second mirror in a first direction in response to said calculated first start point of said second mirror and generating a second arming signal during the travel of said second mirror in a second direction in response to said calculated second start point of said second mirror.

6. The method of claim 5 wherein said sensing of the position of said second mirror is determined by monitoring the second mirror drive signal.

7. The method of claim 3 wherein said oscillating mirror comprises a first set of torsional hinges to oscillate at said selected frequency about a first axis and a second set of torsional hinges to oscillate said mirror about a second axis orthogonal to said first axis at a speed slower than said selected frequency so that said scan lines formed from said modulated light beam traveling in said first direction are aligned with said scan lines formed from said modulated light beam traveling in said second direction.

8. The method of claim 2 wherein said steps of generating said scan lines comprises the steps of generating lines of print for a laser printer.

9. The method of claim 2 wherein said steps of generating said scan lines comprises the steps of generating image lines for a visual display.

10. The method of claim 6 wherein said steps of generating said scan lines comprises the steps of generating image lines for a visual display.

11. The method of claim 1 wherein said mirror is a low frequency mirror and further comprising:

directing a modulated light beam toward said oscillating mirror;

generating an image frame in response to said first trigger signal; and generating a second image frame in response to said second trigger signal.

12. The method of claim 1 wherein said step of sensing comprises the steps of:

directing a light source to said oscillating mirror;

positioning a photo detector such that light from said light source is reflected from said oscillating mirror and impinges on said photo detector at a selected position of said oscillating mirror;

generating a position signal as said light source impinges on said photo detector; and determining amplitude of the mirror motion from two successive position signals.

13. The method of claim 12 wherein said step of positioning a said photo detector comprises the step of positioning two photo detectors.

14. The method of claim 12 further comprising the step of determining the amplitude of the mirror motion from two successive position locations, and wherein said first and second start points are calculated from said position locations, said selected frequency, said amplitude of said mirror.

15. The method of claim 12 wherein said light source has a wave length different than the wave length of the modulated light beam so as to avoid interference between the two.

16. The method of claim 15 wherein said light source is an LED.

17. The method of claim 1 wherein said step of sensing comprises the steps of:

attaching a permanent magnet to the oscillating mirror such that said permanent magnet oscillates as said mirror oscillates;

positioning an electromagnetic coil proximate said oscillating permanent magnet; and monitoring electric current in said coil as said permanent magnet oscillates with said mirror.

18. The method of claim 1 wherein said step of sensing comprises the steps of:

attaching a piezoelectric element to said oscillating mirror structure such that the stress in said piezoelectric element varies as said mirror oscillates;

monitoring the voltage generated by said piezoelectric element as said stress in said element varies to determine the angular position of said oscillating mirror.

19. The method of claim 2 wherein said light beam is modulated by a stream of video signals prior to being directed toward said oscillating mirror and further comprising the step of storing said video signals in a buffer until released in response to said first and second trigger signals.

20. The method of claim 11 wherein said light beam is modulated by a stream of video signals prior to being directed toward said oscillating mirror and further comprising the step of storing said video signals in a buffer until released in response to said first and second trigger signals.

21. The method of claim 5 wherein said light beam is modulated by a stream of video signals prior to being directed toward said oscillating mirror, and further comprising the step of storing said video signals in a buffer until released in response to said arming and trigger signals.

* * * * *